US008601456B2

(12) United States Patent
Duffy et al.

(10) Patent No.: US 8,601,456 B2
(45) Date of Patent: Dec. 3, 2013

(54) SOFTWARE TRANSACTIONAL PROTECTION OF MANAGED POINTERS

(75) Inventors: John Joseph Duffy, Renton, WA (US); Michael M. Magruder, Sammamish, WA (US); Goetz Graefe, Bellevue, WA (US); David Detlefs, Westford, WA (US)

(73) Assignee: Microsoft Corporation, Redmond, WA (US)

( * ) Notice: Subject to any disclaimer, the term of this patent is extended or adjusted under 35 U.S.C. 154(b) by 1874 days.

(21) Appl. No.: 11/499,191

(22) Filed: Aug. 4, 2006

(65) Prior Publication Data

US 2008/0034359 A1 Feb. 7, 2008

(51) Int. Cl.
*G06F 9/45* (2006.01)

(52) U.S. Cl.
USPC ........... 717/154; 717/140; 717/142; 717/143; 717/151; 717/152; 717/155; 717/159

(58) Field of Classification Search
None
See application file for complete search history.

(56) References Cited

U.S. PATENT DOCUMENTS

| | | | |
|---|---|---|---|
| 4,898,132 A | 2/1990 | Kanno | |
| 5,121,498 A | 6/1992 | Gilbert et al. | |
| 5,157,777 A | 10/1992 | Lai | |
| 5,263,155 A | 11/1993 | Wang | |
| 5,274,820 A | 12/1993 | Gillet | |
| 5,446,899 A | 8/1995 | Brett | |
| 5,590,326 A | 12/1996 | Manabe | |
| 5,761,477 A | 6/1998 | Wahbe et al. | |
| 5,802,373 A | 9/1998 | Yates et al. | |
| 5,875,334 A | 2/1999 | Chow et al. | |
| 5,960,436 A | 9/1999 | Chang et al. | |
| 5,983,225 A | 11/1999 | Anfindsen | |
| 5,999,987 A | 12/1999 | O'Farrell | |
| 6,047,125 A | 4/2000 | Agesen et al. | |
| 6,085,035 A | 7/2000 | Ungar | |
| 6,138,269 A | 10/2000 | Ball | |
| 6,173,444 B1 * | 1/2001 | Archambault | 717/159 |
| 6,219,666 B1 | 4/2001 | Krishaswamy et al. | |
| 6,223,335 B1 | 4/2001 | Cartwright et al. | |
| 6,240,413 B1 | 5/2001 | Learmont | |

(Continued)

FOREIGN PATENT DOCUMENTS

| | | |
|---|---|---|
| FR | 2809511 A1 | 11/2001 |
| GB | 2239334 A | 6/1991 |

OTHER PUBLICATIONS

International Search Report, PCT/US2007/015404, Jan. 2, 2008, pp. 1-12.

(Continued)

*Primary Examiner* — Lewis A Bullock, Jr.
*Assistant Examiner* — Mark Gooray

(57) ABSTRACT

Various technologies and techniques are disclosed that provide software transactional protection of managed pointers. A software transactional memory system interacts with and/or includes a compiler. At compile time, the compiler determines that there are one or more reference arguments in one or more code segments being compiled whose source cannot be recovered. The compiler executes a procedure to select one or more appropriate techniques or combinations thereof for communicating the sources of the referenced variables to the called code segments to ensure the referenced variables can be recovered when needed. Some examples of these techniques include a fattened by-ref technique, a static fattening technique, a dynamic ByRefInfo type technique, and others. One or more combinations of these techniques can be used as appropriate.

7 Claims, 12 Drawing Sheets

(56) References Cited

U.S. PATENT DOCUMENTS

| | | | |
|---|---|---|---|
| 6,314,563 | B1 | 11/2001 | Agesen et al. |
| 6,317,870 | B1* | 11/2001 | Mattson, Jr. ................. 717/151 |
| 6,397,379 | B1 | 5/2002 | Yates et al. |
| 6,499,123 | B1 | 12/2002 | McFarland et al. |
| 6,546,443 | B1 | 4/2003 | Kakivaya et al. |
| 6,553,384 | B1 | 4/2003 | Frey |
| 6,654,760 | B2 | 11/2003 | Baskins |
| 6,681,226 | B2 | 1/2004 | Bretl et al. |
| 6,704,926 | B1 | 3/2004 | Blandy et al. |
| 6,718,349 | B2 | 4/2004 | Weedon |
| 6,718,542 | B1 | 4/2004 | Kosche et al. |
| 6,721,945 | B1 | 4/2004 | Sinha |
| 6,735,760 | B1 | 5/2004 | Dice |
| 6,826,757 | B2 | 11/2004 | Steele, Jr. |
| 6,850,938 | B1 | 2/2005 | Sadjadi |
| 6,856,993 | B1 | 2/2005 | Verma et al. |
| 6,865,734 | B2 | 3/2005 | Holzle et al. |
| 6,874,141 | B1 | 3/2005 | Swamy et al. |
| 6,952,829 | B1 | 10/2005 | Banavar et al. |
| 6,981,249 | B1 | 12/2005 | Knoblock et al. |
| 7,000,234 | B1 | 2/2006 | Shavit et al. |
| 7,017,160 | B2 | 3/2006 | Martin et al. |
| 7,028,293 | B2 | 4/2006 | Ruf |
| 7,058,954 | B1 | 6/2006 | Wollrath |
| 7,065,752 | B2 | 6/2006 | Willard |
| 7,069,545 | B2 | 6/2006 | Wang et al. |
| 7,076,784 | B1 | 7/2006 | Russell |
| 7,080,364 | B2 | 7/2006 | Tang et al. |
| 7,082,600 | B1 | 7/2006 | Rau et al. |
| 7,111,290 | B1 | 9/2006 | Yates et al. |
| 7,254,597 | B2 | 8/2007 | Moir et al. |
| 7,254,806 | B1 | 8/2007 | Yates et al. |
| 7,254,808 | B2 | 8/2007 | Trappen et al. |
| 7,395,382 | B1* | 7/2008 | Moir ............................ 711/147 |
| 7,428,725 | B2 | 9/2008 | Niyogi et al. |
| 7,434,010 | B2 | 10/2008 | Duffy |
| 7,478,210 | B2 | 1/2009 | Saha et al. |
| 7,536,517 | B2 | 5/2009 | Harris |
| 7,555,619 | B2 | 6/2009 | Harris |
| 7,590,806 | B2 | 9/2009 | Harris et al. |
| 7,676,638 | B2 | 3/2010 | Duffy |
| 7,716,640 | B2 | 5/2010 | Pik et al. |
| 7,895,582 | B2 | 2/2011 | Duffy |
| 2002/0010911 | A1 | 1/2002 | Cheng et al. |
| 2002/0116403 | A1 | 8/2002 | Weedon |
| 2002/0165727 | A1 | 11/2002 | Greene et al. |
| 2003/0033328 | A1 | 2/2003 | Cha et al. |
| 2003/0236786 | A1 | 12/2003 | Shi et al. |
| 2003/0237077 | A1 | 12/2003 | Ghiya et al. |
| 2004/0003278 | A1 | 1/2004 | Chen et al. |
| 2004/0015642 | A1 | 1/2004 | Moir et al. |
| 2004/0015925 | A1 | 1/2004 | Hanson |
| 2004/0205740 | A1 | 10/2004 | Lavery |
| 2005/0188362 | A1* | 8/2005 | Metzger et al. ................ 717/151 |
| 2006/0036574 | A1 | 2/2006 | Schweigkoffer et al. |
| 2006/0136454 | A1 | 6/2006 | Tchouati et al. |
| 2010/0169869 | A1* | 7/2010 | Hamilton ...................... 717/140 |

OTHER PUBLICATIONS

International Search Report, PCT/US06/29327, Jan. 22, 2008, pp. 1-11.
Non-Final Rejection, U.S. Appl. No. 12/197,043, dated Jul. 22, 2009, pp. 1-5.
Response to Non-Final Rejection, U.S. Appl. No. 12/197,043, dated Oct. 5, 2009, pp. 1-3.
Notice of Allowance and Fees Due, U.S. Appl. No. 12/197,043, dated Dec. 2, 2009, pp. 1-4.
New Zealand Examination Report, Application No. 565417, dated Sep. 24, 2009, pp. 1-2.
EP Search Report, Communication, Application No. EP07835975.9, dated Apr. 27, 2010, pp. 1-7.
EP Search Report, Application No. EP06788738.0, dated Nov. 5, 2010, pp. 1-11.
Moore et al., "Thread-Level Transaction Memory," dated Mar. 31, 2005, University of Wisconsin, Department of Computer Sciences, pp. 1-12.
Ennals, "Efficient Software Transactional Memory," dated Jan. 1, 2003, Intel Research, Cambridge, UK, pp. 1-16.
Marathe, "Software Transactional Memory Algorithms for Dynamic Transactions," dated Nov. 2004, University of Rochester, Department of Coomputer Science, pp. 1-30.
Chinese First Office Action, Application No. 200680026687.X, dated Jun. 17, 2010, pp. 1-16.
Chinese Response to First Office Action, Application No. 200680026687.X, dated Oct. 21, 2010, pp. 1-20.
EP Search Report, Rules 70(2) and 70a(2) EPC, Application No. EP07835975.9, dated May 17, 2010, p. 1.
EP Search Report, Rule 62a(1) EPC, Application No. EP06788738.0, dated Aug. 6, 2010, pp. 1-2.
Response to EP Search Report, Communication, Application No. EP07835975.9, dated Sep. 10, 2010, pp. 1-12.
Response to EP Search Report, Rule 62a(1) EPC, Application No. EP06788738.0, dated Oct. 5, 2010, pp. 1.
Chinese Voluntary Amendments, Application No. 200680026687.X, dated Nov. 17, 2009, pp. 1-8.
Herlihy et al., "Transactional Memory: Architectural Support for Lock-Free Data Structures", International Symposium on Computer Architecture—ISCA , May 1993, San Diego, California, ACM SIGARCH Computer Architecture News , pp. 289-300.
Shaughnessy, "Managed Code Database Advantage for the Microsoft .NET Framework Platform", BorCon Borland Conference, Sep. 11-15, 2004, San Jose, California, pp. 1-5.
Herlihy et al., "Software Transactional Memory for Dynamic-Sized Data Structures", Symposium on Principles of Distributed Computing—PODC, Jul. 13-16, 2003, Boston, Massachusetts, pp. 92-101.
Non-Final Rejection, U.S. Appl. No. 11/192,784, dated Jan. 11, 2008, 9 pages.
Response to Non-Final Rejection, U.S. Appl. No. 11/192,784, dated Mar. 25, 2008, 16 pages.
Non-Final Rejection, U.S. Appl. No. 11/192,784, dated Aug. 4, 2008, 12 pages.
Response to Non-Final Rejection, U.S. Appl. No. 11/192,784, dated Oct. 9, 2008, 12 pages.
Notice of Allowance and Fees Due, U.S. Appl. No. 11/192,784, dated Feb. 12, 2009, 4 pages.
Notice of Allowance and Fees Due, U.S. Appl. No. 11/499,091, 5 pages.
Non-Final Rejection, U.S. Appl. No. 11/499,012, dated Apr. 1, 2010, 24 pages.
Response to Non-Final Rejection, U.S. Appl. No. 11/499,012, dated May 27, 2010, 11 pages.
Non-Final Rejection, U.S. Appl. No. 11/499,012, dated Jul. 20, 2010, 9 pages.
Response to Non-Final Rejection, U.S. Appl. No. 11/499,012, dated Oct. 14, 2010, 12 pages.
Notice of Allowance and Fees Due, U.S. Appl. No. 11/499,012, dated Nov. 16, 2010, 11 pages.
Shavit et al., "Software Transaction Memory", 12th Annual ACM Symposium on Principles of Distributed Compiling (PODC), 1995, Ottawa, Canada, pp. 204-213.
Marathe et al., "Adaptive Software Transactional Memory," Technical Report #868, May 2005, Department of Computer Science, University of Rochester, Rochester, New York, pp. 1-15.
Harris et al., "Language Support for Lightweight Transactions," 18th Annual ACM SIGPLAN Conference, Oct. 2003, ACM Press, New York, New York, pp. 388-402.
Ennals, R. Cache Sensitive Software Transactional Memory, 2005, Intel Research, Cambridge, United Kingdom, pp. 1-11.
Fraser, Practical Lock-Freedom, Technical Report #579, Feb. 2004, University of Cambridge—Computer Laboratory, Cambridge, United Kingdom, pp. 1-116.
Harris et al., "Revocable Locks for Non-Blocking Programming," 10th Annual ACM SIGPLAN Symposium on Priniciples and Practice of Parallel Programming, Jun. 2005, ACM Press, New York, New York, pp. 72-82.

(56) References Cited

OTHER PUBLICATIONS

Harris et al., "Composable Memory Transactions," ACM SIGPLAN Symposium on Principles and Practice of Parallel Programming, Dec. 2004, ACM Press, New York, New York, pp. 48-60.
Kienzle, "Open Multithreaded Transactions: A Transaction Model for Concurrent Object-Oriented Programming," retrieved from <http://jotm.objectweb.org/TP_related.html>, Apr. 2001, pp. 1-269.
Moravan et al., "Supporting Nested Transactional Memory in LogTM," ACM ASPLOS, Oct. 2006, San Jose, California, pp. 359-370.
Quislant et al., "Improving Signatures by Locality Exploitation for Transactional Memory," PACT, Sep. 2009, Raleigh, North Carolina, IEEE, pp. 303-312.
Felber et al., "The VELOX Transactional Memory Stack," IEEE Micro, 2010, Los Alamitos, California, pp. 1-9.
Jia et al., "Certifying Compilation for a Language with Stack Allocation," LICS Symposium, Jun. 2005, Chicago, Illinois, pp. 1-10.
McDonald et al., "Architectural Semantics for Practical Transactional Memory," IEEE Computer Society, 2006 Washington, DC, pp. 53-65.
Saha et al., "McRT-STM: A High Performance Software Transactional Memory System for a Multi-Core Runtime," 2006, ACM Press, New York, New York, pp. 187-197.
Tabatabi et al., "Compiler and Runtime Support for Efficient Software Transactional Memory," 2006, ACM Press, New York New York, pp. 26-37.
Atkins, "Adaptable Concurrency Control for Atomic Data Types", Aug. 1992, vol. 10, No. 3, retrieved from <http://portal.acm.org/citation.cfm?id=146939&coll=ACM&dl=ACM&CFID=176859 &CFTOKEN=92839444>, pp. 190-225.
Herlihy, "Apologizing versus Asking Permission: Optimistic Concurrency Control on Abstract Data Types," Mar. 1990, vol. 15, No. 1, retrieved from <http://portal.acm.org/citation.cfm?id=77647 &coll=ACM&dl=ACM&CFID=176859&CFTOKEN=92839444>, pp. 96-124.
Herlihy, "Optimistic Concurrency Control for Abstract Data Types," 1986, retrieved from <http://delivery.acm.org/10.1145/20000/10608/p206-herlihy.pdf?key1=10608&key2=4622283511 &coll=ACM&dl=ACM&CFID=176859&CFTOKEN=92839444>, pp. 206-217.
International Search Report, PCT/US2007/015405, Jan. 23, 2008, pp. 1-10.
Minwen et al., "Seneca: Remote Mirroring Doe Write," Proceedings of USENIX Technical Conference, San Antonio, Texas, Jun. 2003, pp. 253-268.
Response to EP Office Action, Appliation No. 06 788 738.0, dated May 27, 5011, 8 pages.
Response to EP Office Action, Application No. 06 788 738.0, dated May 27, 2011, 8 pages.
Response to EP Office Action, Application No. 07 835 974.2, dated Jul. 19, 2011, 1 page.
CN Notice on Grant of Patent Right for Invention, Application No. 200680026687, dated Jun. 17, 2011, 4 pages.
JP Notice of Rejection, Application No. 2008-524174, dated Aug. 23, 2011, 2 pages.
English Translation of JP Notice of Rejection, Application No. 2008-524174, dated Aug. 23, 2011, 2 pages.
CN Patent Certificate for Invention, Application No. 200680026687, dated Nov. 9, 2011, 4 pages.
JP Amendment to Notice of Rejection, Application No. 2008-524174, dated Nov. 21, 2011, 5 pages.
JP Argument to Notice of Rejection, Application No. 2008-524174, dated Nov. 21, 2011, 3 pages.
JP Notice of Rejection, Application No. 2008-524174, dated Dec. 13, 2011, 1 page.
English Translation of JP Notice of Rejection, Application No. 2008-524174, dated Dec. 13, 2011, 1 page.
Extended EP Search Report, Application No. 07835974.2, dated Sep. 28, 2011, 14 pages.
Response, EP Application No. 07835974.2, dated Apr. 27, 2012, 12 pages.
EP Application No. 06788738.0, Official Communication dated Feb. 6, 2012, 5 pages.
EP Application No. 06788738.0, Response to Official Communication, dated Jun. 13, 2012, 13 pages.

\* cited by examiner

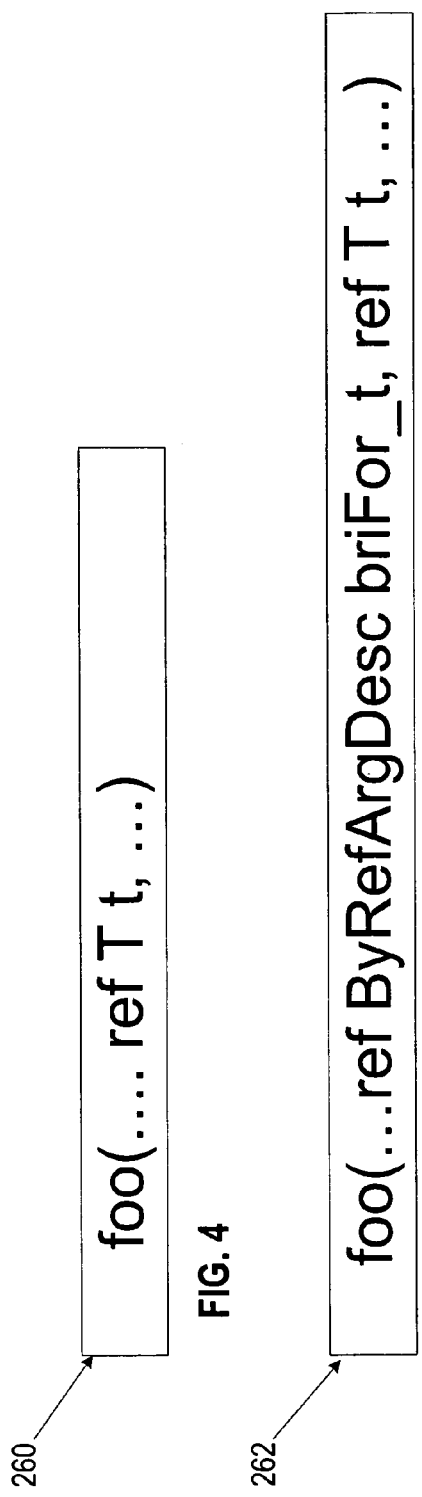
FIG. 4
FIG. 5
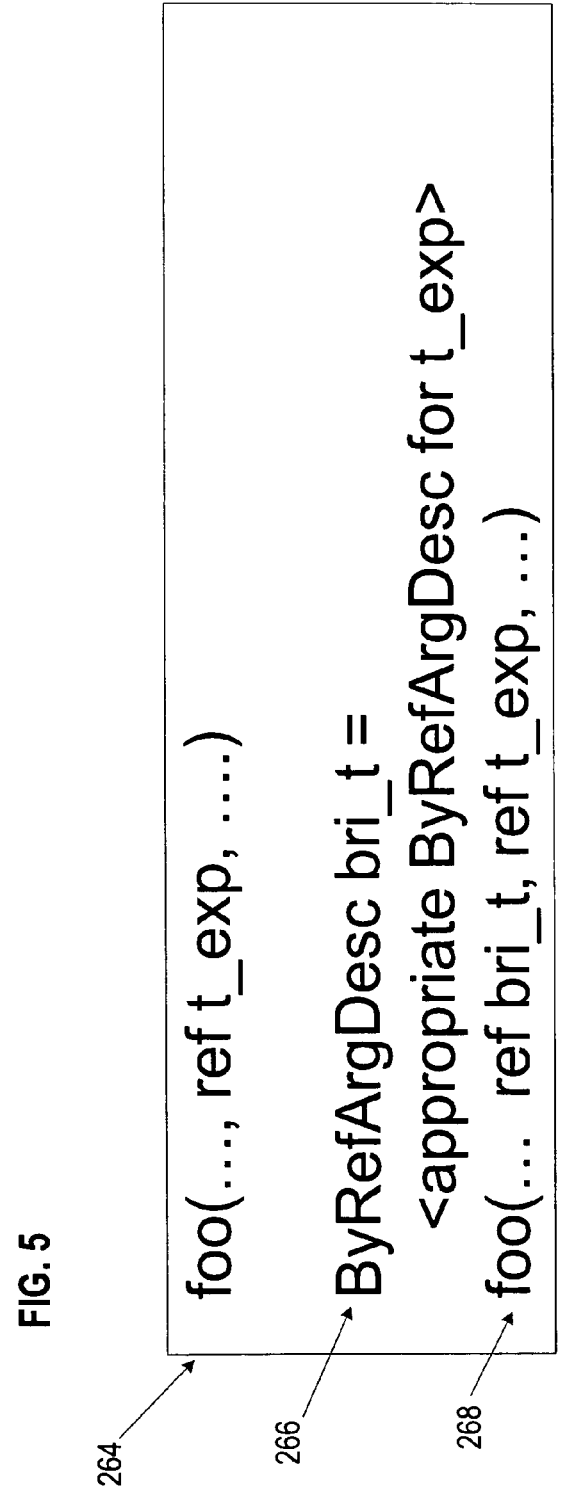
FIG. 6

```
int& t1;
if (<some-predicate>) {
    t1 = &o.f;
} else {
    t1 = &Clss.someStatic;   }
foo(t1);
```

FIG. 13

```
int& t1;
ByRefArgDesc dbri4t1;
if (<some-predicate>) {
    t1 = &o.f;
    dbri4t1.kind = BRAK_Obj;
    dbri4t1.val  = offsetof(o.f);
} else {
    t1 = &Clss.someStatic;
    dbri4t1.m_kind = BRAK_TMW;
    dbri4t1.m_val  = TMW address
                     for Clss.someStatic;
}
foo(t1);
```

FIG. 14

SOFTWARE TRANSACTIONAL PROTECTION OF MANAGED POINTERS

BACKGROUND

Software transactional memory (STM) is a concurrency control mechanism analogous to database transactions for controlling access to shared memory in concurrent computing. A transaction in the context of transactional memory is a piece of code that executes a series of reads and writes to shared memory. A data value in the context of transactional memory is the particular segment of shared memory being accessed, such as a single object, a cache line (such as in C++), a page, a single word, etc.

A software transactional memory system must implement transactional semantics for all memory operations, otherwise atomicity and isolation are compromised. Object-based STMs use a per-object concurrency control mechanism: each object contains "metadata" used by the STM for concurrency control (a kind of lock). This requires that, at the point of invoking a transactional operation on a field of an object, the object's identity can be discovered. But even object-based systems have data not stored in objects: e.g., static and local variables. STMs may transct such data in a different fashion. Unfortunately, in a software system that permits taking an address of a data item and passing this address to separately compiled functional units, often the source of the data item cannot be recovered. As an example, consider this C# code:

```
class Clss {
    int m_fld;
    static int s_fld;
}
void a( ) {
    int j = 7;
    Data d = new Clss( );
    int[ ] arr = new int[1];
    b(ref j);
    b(ref d.m_fld);
    b(ref Clss.s_fld);
    b(ref arr[0]);
}
void b(ref int x) {
    atomic {
        x++;
    }
}
```

This code examples above illustrate the classic problem. When method b is compiled, the runtime argument that will be supplied for the parameter x is not known. Yet the caller, a, calls b with four different types of values, each of which refers to a type of location which utilizes different concurrency control mechanisms. Generally, object-based STM systems ensure transactional semantics for static variables, local variables (locals and arguments), and instance fields or array elements in different ways, meaning b must somehow recover the source of the argument x.

SUMMARY

Various technologies and techniques are disclosed that provide software transactional protection of managed pointers. A software transactional memory system interacts with and/or includes a compiler. At compile time, the compiler determines that there are one or more reference arguments in one or more code segments being compiled whose source cannot be recovered. The compiler executes a procedure to select one or more appropriate techniques or combinations thereof for communicating the sources of the referenced variables to the called code segments to ensure the referenced variables can be recovered when needed. Some examples of these techniques include a fattened by-ref technique, a static fattening technique, a dynamic ByRefInfo type technique, and others. One or more combinations of these techniques can be used as appropriate.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4 is a diagram that includes a code segment illustrating a code segment typed by a developer in a programming language.

FIG. 5 is a diagram that includes a code segment of one implementation that illustrates how the code segment of FIG. 4 is modified in the called function using the fattened by-ref technique described in FIG. 3.

FIG. 6 is a diagram that includes a code segment of one implementation that illustrates how the calling function is modified using the fattened by-ref technique described in FIG. 3.

FIG. 13 is a diagram that includes a code segment illustrating a code segment typed by a developer in a programming language.

FIG. 14 is a diagram that includes a code segment of one implementation that illustrates how the code segment of FIG. 13 is modified using the dynamic ByRefInfo type technique described in FIG. 12.

DETAILED DESCRIPTION

Figure 1:
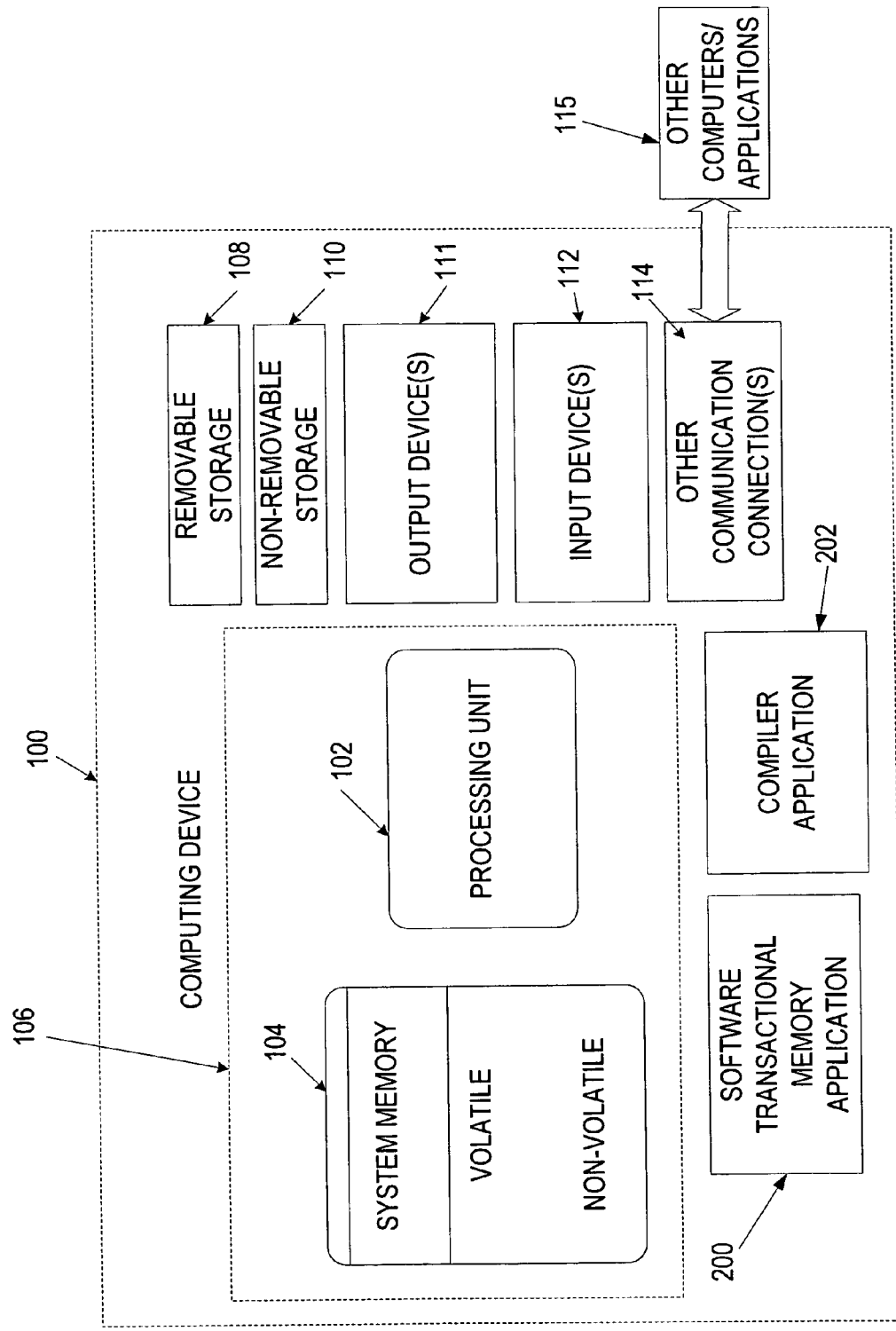
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as a software transactional memory system, but the system also serves other purposes in addition to these. In one implementation, one or more of the techniques described herein can be implemented as features within a framework program such as MICROSOFT® .NET Framework, or from any other type of program or service that provides platforms for developers to develop software applications. In another implementation, one or more of the techniques described herein are implemented as features with other applications that deal with developing applications that execute in concurrent environments.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes software transactional memory application 200 and compiler application 202. In one implementation, compiler application 202 uses the software transactional memory application 200 to generate properly transacted code.

Figure 2:
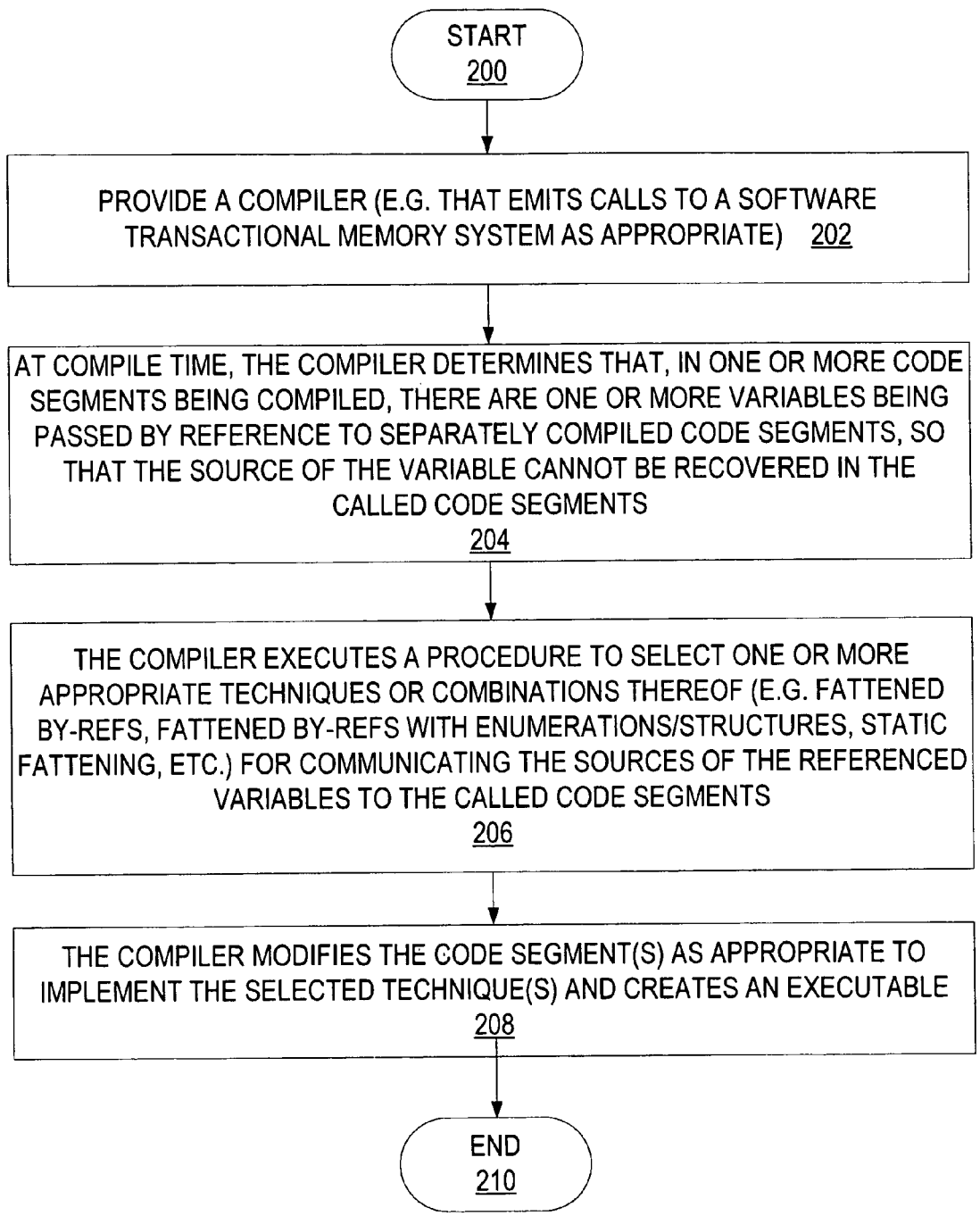
FIG. 2 is a high-level process flow diagram for one implementation of the system of FIG. 1.

Turning now to FIGS. 2-14 with continued reference to FIG. 1, the stages for implementing one or more implementations of software transactional memory application 200 are described in further detail. In one form, the process of FIG. 2 is at least partially implemented in the operating logic of computing device 100. The procedure begins at start point 200 with providing a compiler (e.g. that emits calls to a software transactional memory system as appropriate) (stage 202). At compile time, the compiler determines that, in one or more code segments being compiled, there are one or more variables being passed by reference to separately compiled code segments, which prevents the source of those references from being identified or recovered in the called code segments (stage 204). The compiler executes a procedure to select one or more appropriate techniques or combinations thereof (e.g. fattened by-refs, fattened by-refs with enumerations/structures, static fattening, etc.) for communicating the sources of these references from the calling code segments to the called code segments (stage 206). The compiler modifies the code segment(s) as appropriate to implement the selected technique(s) and creates an executable (stage 208). The process ends at end point 210.

Figure 3:
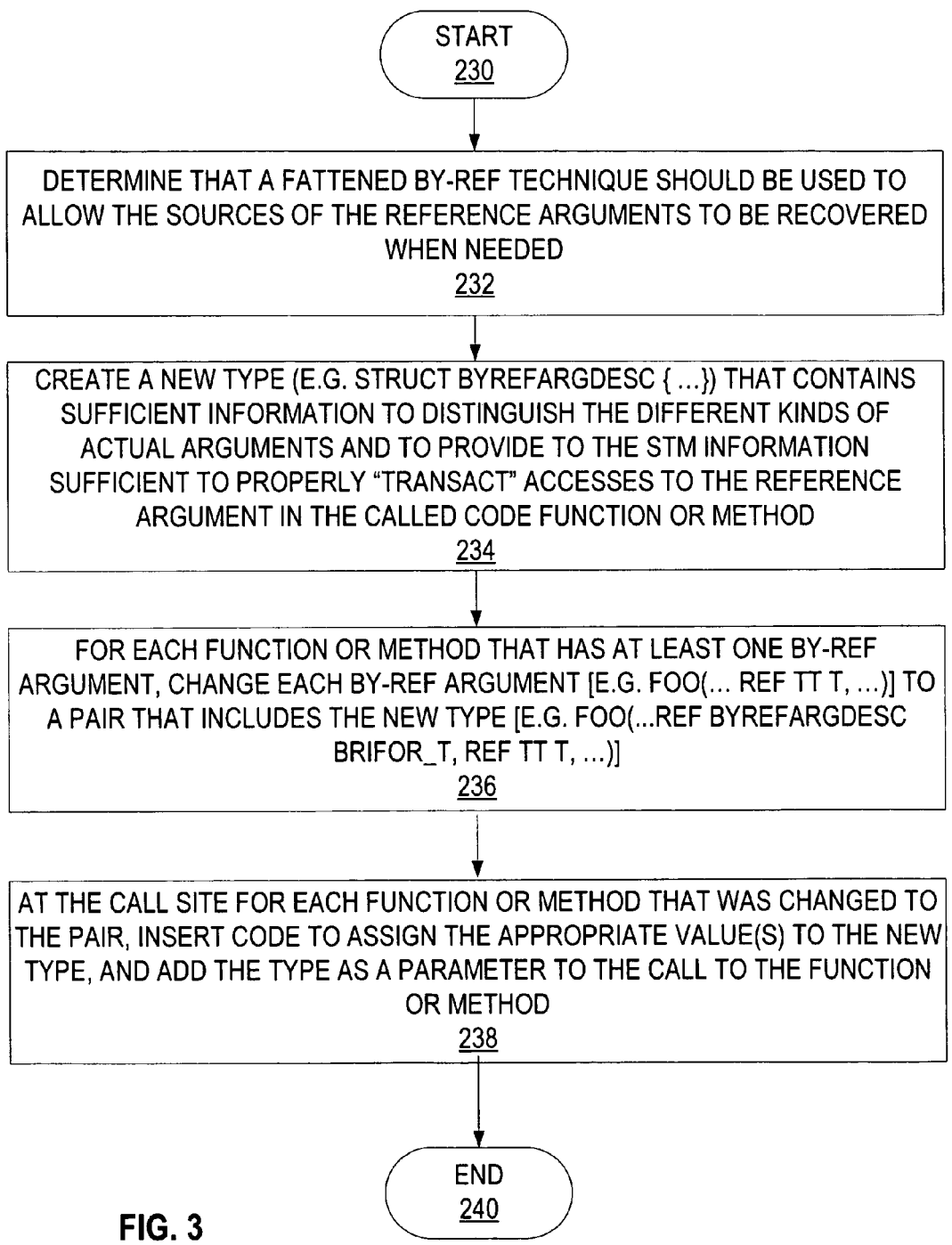
FIG. 3 is a process flow diagram for one implementation of the system of FIG. 1 illustrating the stages involved in using a fattened by-ref technique to allow the identity of the object (s) to be recovered.

FIG. 3 illustrates one implementation of the stages involved in using a fattened by-ref technique to allow the identity of the object(s) to be recovered. In one form, the process of FIG. 3 is at least partially implemented in the operating logic of computing device 100. The procedure begins at start point 230 with determining that a fattened by-ref technique should be used to allow the sources of the reference arguments to be recovered when needed (stage 232). A new type (e.g. struct ByRefArgDesc{ . . . }) is created that contains sufficient information to distinguish the different kinds of actual arguments and to provide the transactional memory system sufficient information to employ appropriate methods of implementing transactional semantics for accesses to the reference argument in the called code function or method (stage 234). For each function or method that has at least one by-ref argument, change each by-ref argument [e.g. foo( . . . ref tt t, . . . )] to a pair that includes the new type [e.g. foo( . . . ref ByRefArgDesc brifor_t, ref tt t, . . . )] (stage 236). At the call site for each function or method that was changed to the pair, insert code to assign the appropriate value(s) to the new type, and add the type as a parameter to the call to the function or method (stage 238). The process ends at end point 240.

Turning now to FIG. 4-6, some exemplary code segments are illustrated to show how the code typed by the developer is modified based upon the fattened by-ref techniques discussed in FIG. 3. FIG. 4 is a diagram that includes a code segment illustrating a code segment 260 typed by a developer in a programming language. FIG. 5 is a diagram that includes a code segment 262 of one implementation that illustrates how the code segment of FIG. 4 is modified in the called function using the fattened by-ref technique described in FIG. 3. Note how the extra argument (ref ByRefArgDesc briFor_t) is inserted in the call to foo. Turning now to FIG. 6, the calling function 264 for foo is shown as modified using the fattened by-ref technique described in FIG. 3. Note how a value is assigned to the ByRefArgDesc bri_t variable 266, and the value is then passed as an argument to foo 268.

Figure 7:
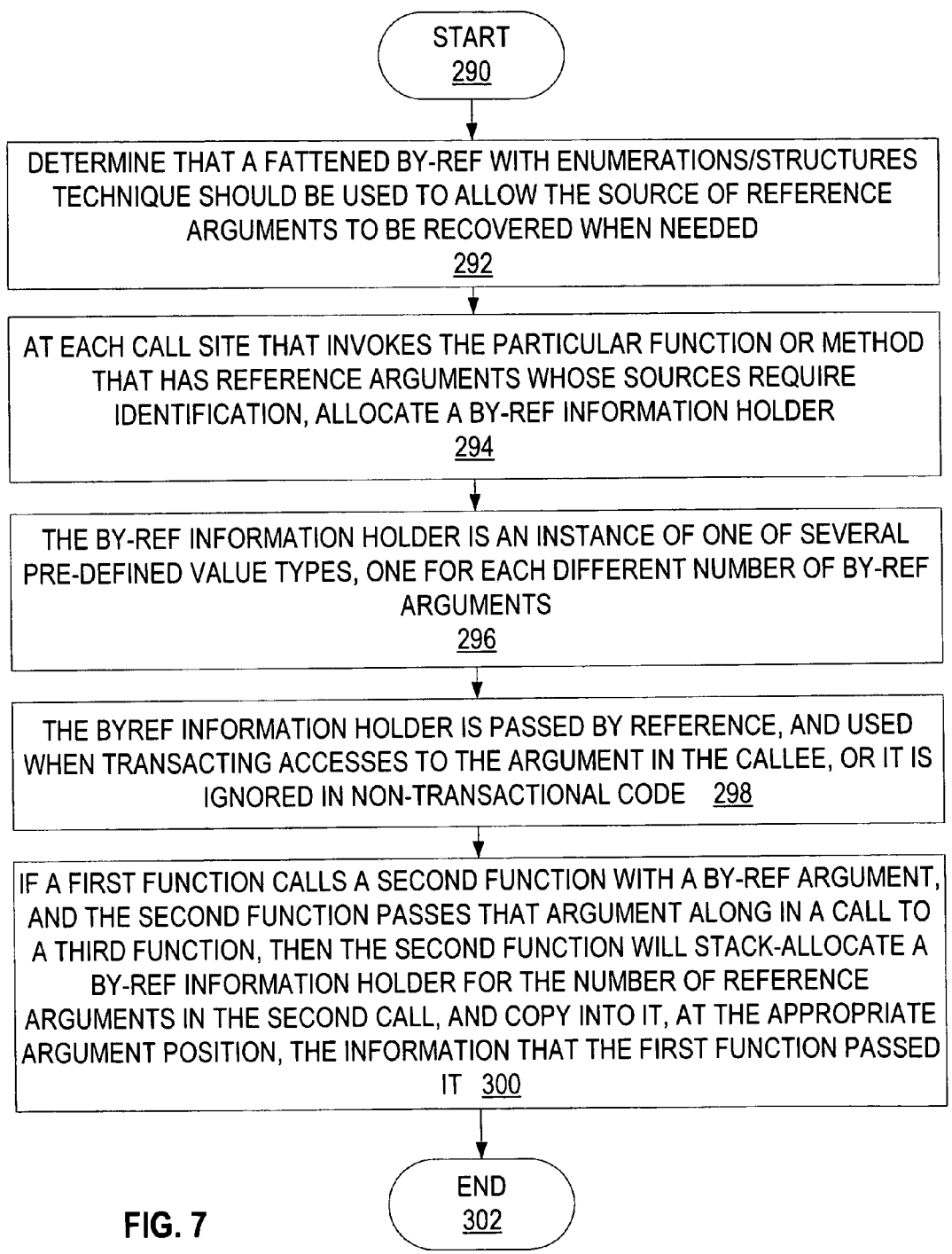
FIG. 7 is a process flow diagram for one implementation of the system of FIG. 1 illustrating the stages involved in using a fattened by-ref with enumerations/structures technique to allow the identity of the object(s) to be recovered.

FIG. 7 illustrates one implementation of the stages involved in using a variant of the fattened by-ref technique described above, with enumerations/structures technique to allow the sources of the reference arguments to be recovered.

In this variant, when a function or method has several by-ref arguments, their respective ByRefArgDesc descriptors are gathered together into a single composite data structure (a ByRefInfoHolder), and this data structure is passed by reference to the called function or method, adding only a single extra argument instead of one extra argument for each reference argument.

In one form, the process of FIG. 7 is at least partially implemented in the operating logic of computing device 100. The procedure begins at start point 290 with determining that a fattened by-ref with enumerations/structures technique should be used to allow the source (e.g. identity) of reference arguments to be recovered when needed (stage 292). At each call site that invokes the particular function or method that has by-ref arguments whose sources require identification, allocate a ByRefInfoHolder of a size sufficient to hold the information for all the by-ref arguments of the invoked function (stage 294). The ByRefInfoHolder is an instance of one of several pre-defined value types, one for several different numbers of by-ref arguments, up to some maximum (stage 296). If the number of by-ref arguments in a method exceeds this maximum, several such ByRefInfoHolders may be allocated, and passed as multiple arguments, or each ByRefInfoHolder can refer to the next in turn. The ByRefInfoHolder is passed by reference, and used when transacting accesses to the argument in the callee, or it is ignored in non-transactional code (stage 298). If a first function calls a second function with a by-ref argument, and the second function passes that argument along in a call to a third function, then the second function will stack-allocate a ByRefInfoHolder for the number of reference arguments in the second call, and copy into it, at that the appropriate argument position, the information that the first function passed it (stage 300). The process ends at end point 302.

Figure 8:
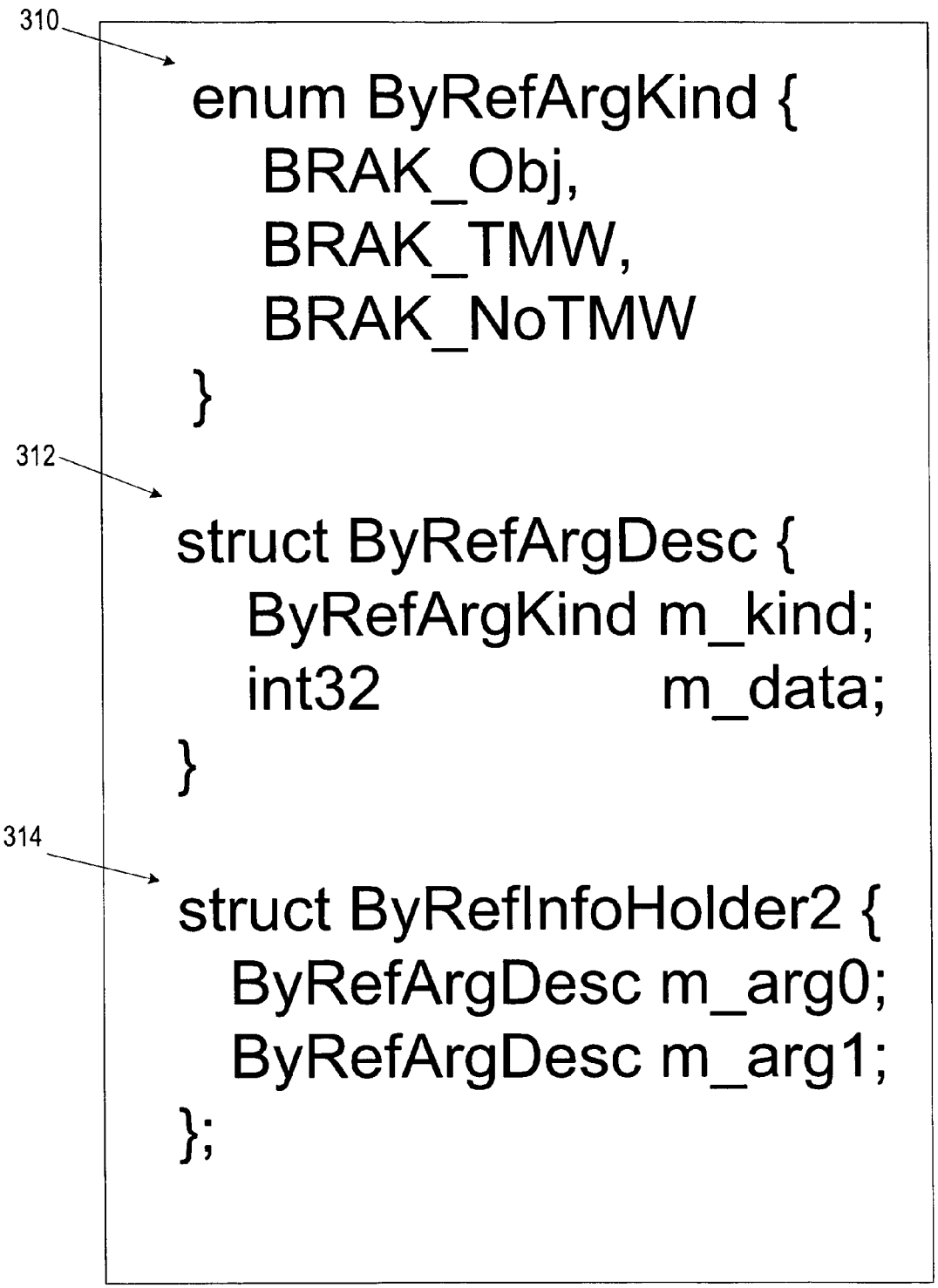
FIG. 8 is a diagram that includes a code segment illustrating a definition of a by-ref argument descriptor for one implementation as used in the technique described in FIG. 7.

FIG. 8 is a diagram that includes a code segment illustrating a definition of a by-ref argument descriptor for one implementation as used in the techniques described in FIG. 7. The code segment includes an enumeration called ByRefArgKind 310, a structure called ByRefArgDesc 312, and a structure called ByRefInfoHolder2 314. In the ByRefArgDesc, the contents of the corresponding m_data field depend on the kind. For BRAK_Obj, the by-ref argument is an interior pointer into some heap object, and the field contains the offset of the by-ref in the object. This case covers object fields and array elements (of any dimension). For the BRAK_TMW, the field contains a Transactional Memory Word (TMW), which is used for concurrency control. In one implementation, the TMW contains a version, a count of pessimistic readers, and an exclusive writer indicator. This covers (at least) statics. For the BRAK_NoTMW, the contents of the field are irrelevant, since the by-ref does not require transactional primitives. This covers locals, and may also cover by-refs in calls from unmanaged code back to managed.

Figure 9:
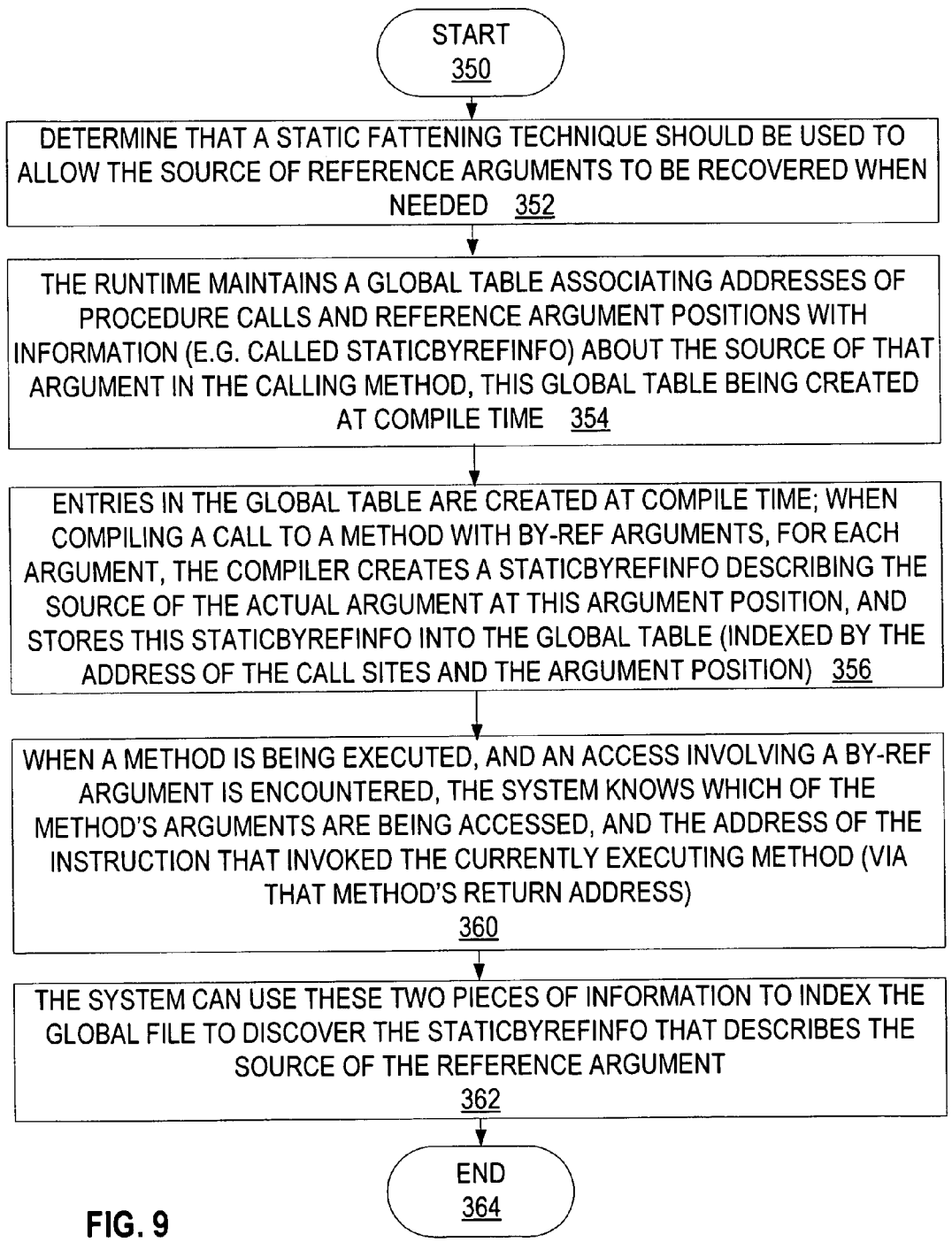
FIG. 9 is a process flow diagram for one implementation of the system of FIG. 1 illustrating the stages involved in using a static fattening technique to allow the identity of the object (s) to be recovered.

FIG. 9 illustrates one implementation of the stages involved in using a static fattening technique to allow the identity of the object(s) to be recovered. In one form, the process of FIG. 9 is at least partially implemented in the operating logic of computing device 100. The procedure begins at start point 350 with determining that a static fattening technique should be used to allow the source of reference arguments to be recovered when needed (stage 352). The runtime maintains a global table associating addresses of procedure calls and reference argument positions with information about the source of that argument in the calling method; such information is called a StaticByRefInfo (stage 354). Entries in this table are created at compile time; when compiling a call to a method with by-ref arguments, for each such by-ref argument, the compiler creates a StaticByRefInfo describing the source of the actual argument at this argument position, and stores this StaticByRefInfo into the global table (indexed by the address of the call sites and the argument position) (stage 356). When a method is being executed, and an access involving a by-ref argument is encountered, the system knows which of the method's arguments are being accessed, and the address of the instruction that invoked the currently-executing method (via that method's return address) (stage 360). The system can use these two pieces of information to index the global table to discover the StaticByRefInfo that describes the source of the reference argument (stage 362). The process ends at end point 364.

Figure 10:
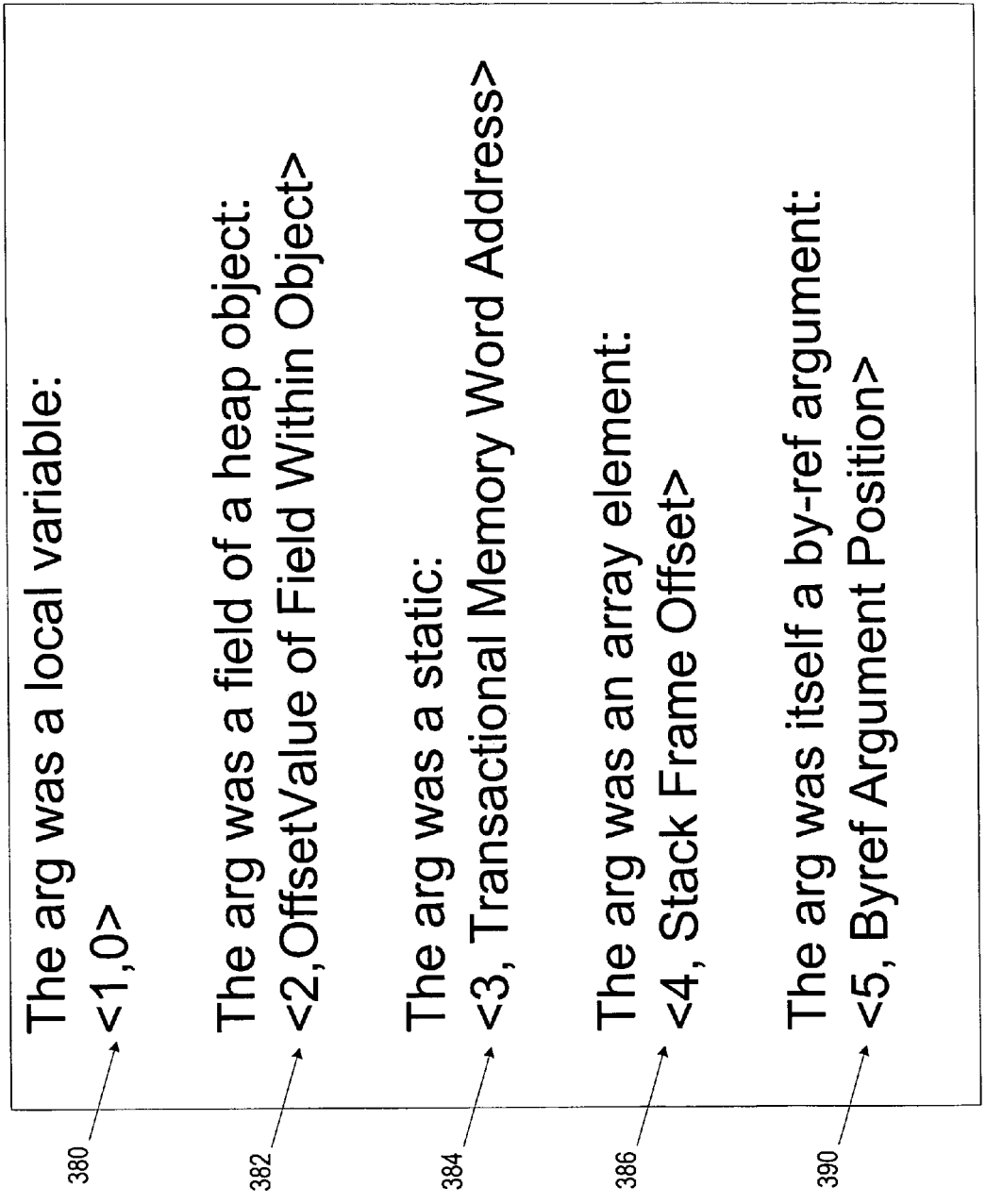
FIG. 10 is a diagram of one implementation that illustrates some exemplary values that can be included in an enumeration for a StaticByRefInfo structure.

FIG. 10 is a diagram of one implementation that illustrates some exemplary values that can be included in an enumeration for a StaticByRefInfo structure. In one implementation, a StaticByRefInfo structure contains two arguments: the first one being just an identifier that is used to indicates the type of argument (e.g. local, heap, static, etc.), and the second one being the auxiliary data that describes the argument in further detail. For example, if the argument was a local variable, then the structure 380 might contain <1,0>. In that example, the 1 indicates that it is a local variable (e.g. 1=local variable), and the 0 is just auxiliary data that is not really needed in this particular scenario. If the argument was a field of a heap object, then the structure 382 might contain the number two for the first position (e.g. 2=heap object), and the second position might contain the offset value of the field within the object. If the argument was a static, then the structure might contain a number three for the first position (e.g. 3=static), and the second position might contain the TMW address. If the argument was an array element, then the structure 386 might contain a number 4 for the first position (e.g. 4=array element), and the second position might contain a stack frame offset value, indicating a location in the caller's stack frame that will contain the array reference. If the argument was itself a by-ref argument, then the structure 390 might contain a five (e.g. 5=by-ref argument) for the first position, and the second position might contain the by-ref argument position.

Figure 11:
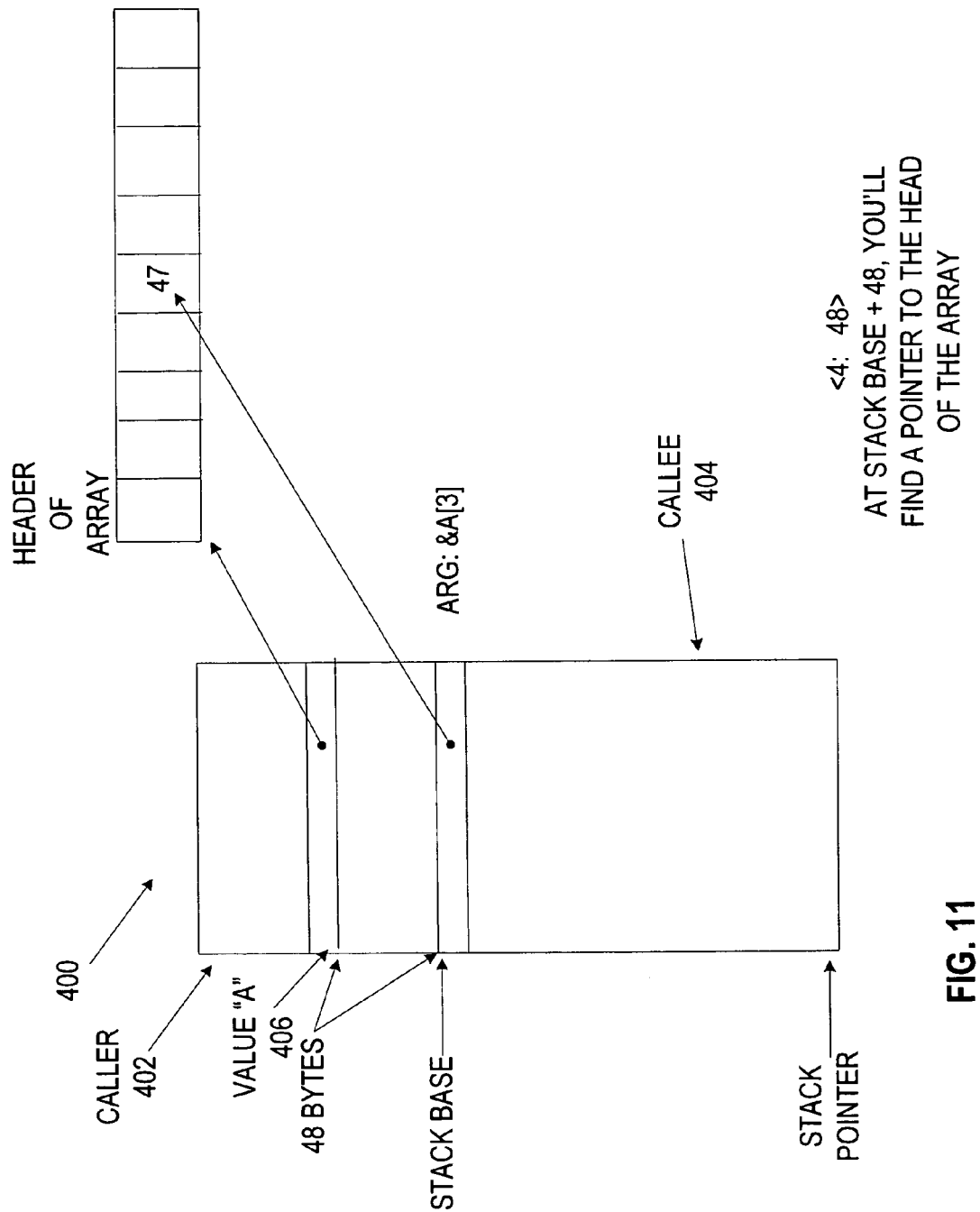
FIG. 11 is a diagram that of one implementation that illustrates exemplary stack frame contents when the techniques in FIG. 9 are used.

FIG. 11 is a diagram 400 of one implementation that illustrates exemplary stack frame contents when the techniques in FIG. 9 are used. A caller method 402 calls a callee 404. The caller method has a local variable a containing a reference to an array of integers. The variable a is held in a stack slot (406) located 48 bytes above the stack pointer in the caller stack frame. The caller passes a reference to the $4^{th}$ element of that array to the callee. In compiling the caller, the compiler puts an entry <4, 48> in the global table to describe this reference argument. This indicates that the reference is to an element of an array, and that a reference to the head of the array (required by the transactional memory implementation), may be found by looking 48 bytes above the bottom of the caller's stack frame.

Figure 12:
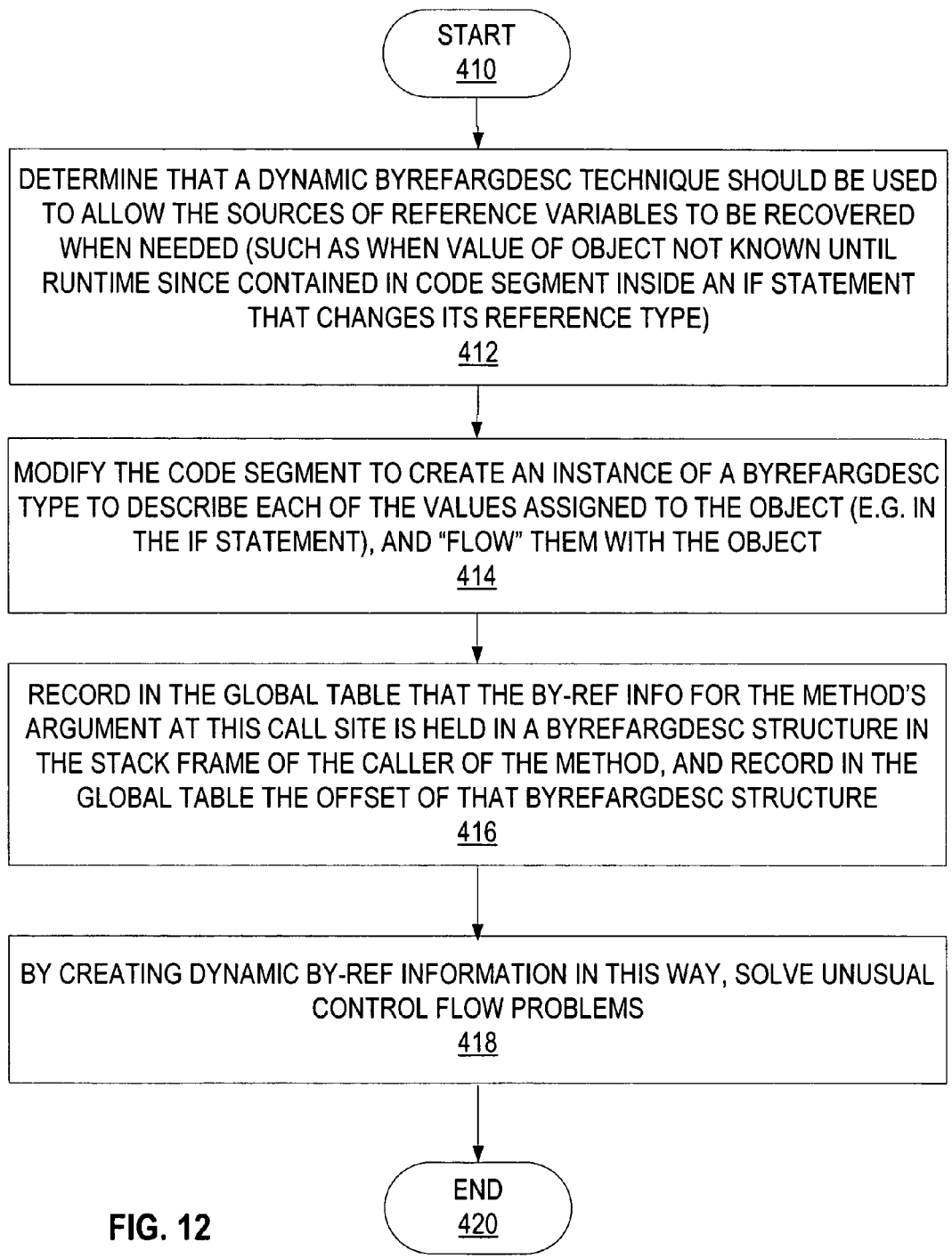
FIG. 12 is a process flow diagram for one implementation of the system of FIG. 1 that illustrates the stages involved in using a dynamic ByRefInfo type technique to allow the identity of the object(s) to be recovered for unusual control flow situations.

FIG. 12 illustrates one implementation of the stages involved in using a dynamic ByRefArgDesc type technique to allow the identity of the object(s) to be recovered for unusual control flow situations. In one form, the process of FIG. 12 is at least partially implemented in the operating logic of computing device 100. The procedure begins at start point 410 with determining that a dynamic ByRefArgDesc type technique should be used to allow the sources of reference variables to be recovered when needed (such as when value of an object is not known until runtime since it is contained in a code segment inside an IF statement that changes its reference type) (stage 412). The system modifies the code segment to create an instance of ByRefArgDesc type to describe each of the values assigned to the object (e.g. in the IF statement), and "flow" them with the object (stage 414). The system records in the global table that the by-ref info for the method's argument at this call site is held in a dynamic ByRefArgDesc structure in the stack frame of the caller of the method, and records in the global table the offset of that dynamic ByRefArgDesc structure (stage 416). By creating dynamic by-ref information in this way, unusual control flow problems can be solved (stage 418). The process ends at end point 420.

Turning now to FIGS. 13-14, code examples are shown that illustrate how code typed by a developer is modified based upon the techniques described in FIG. 12 to allow the object(s) to be recovered in unusual control flow situations. FIG. 13 is a diagram that includes a code segment 440 typed by a developer in a programming language. The code segment 440 includes an IF statement that changes the value of t1 to two different types of values depending on the outcome (442 and 444, respectively). FIG. 14 shows how the code segment 440 is modified according to the techniques of FIG. 12. For example, a dynamic ByRefArgDesc object is declared in the beginning of the procedure (called dbri4t1). The kind and val properties are then set for the object depending on the direction taken in the IF statements (448, 450, 452, and 454, respectively).

Figure 15:
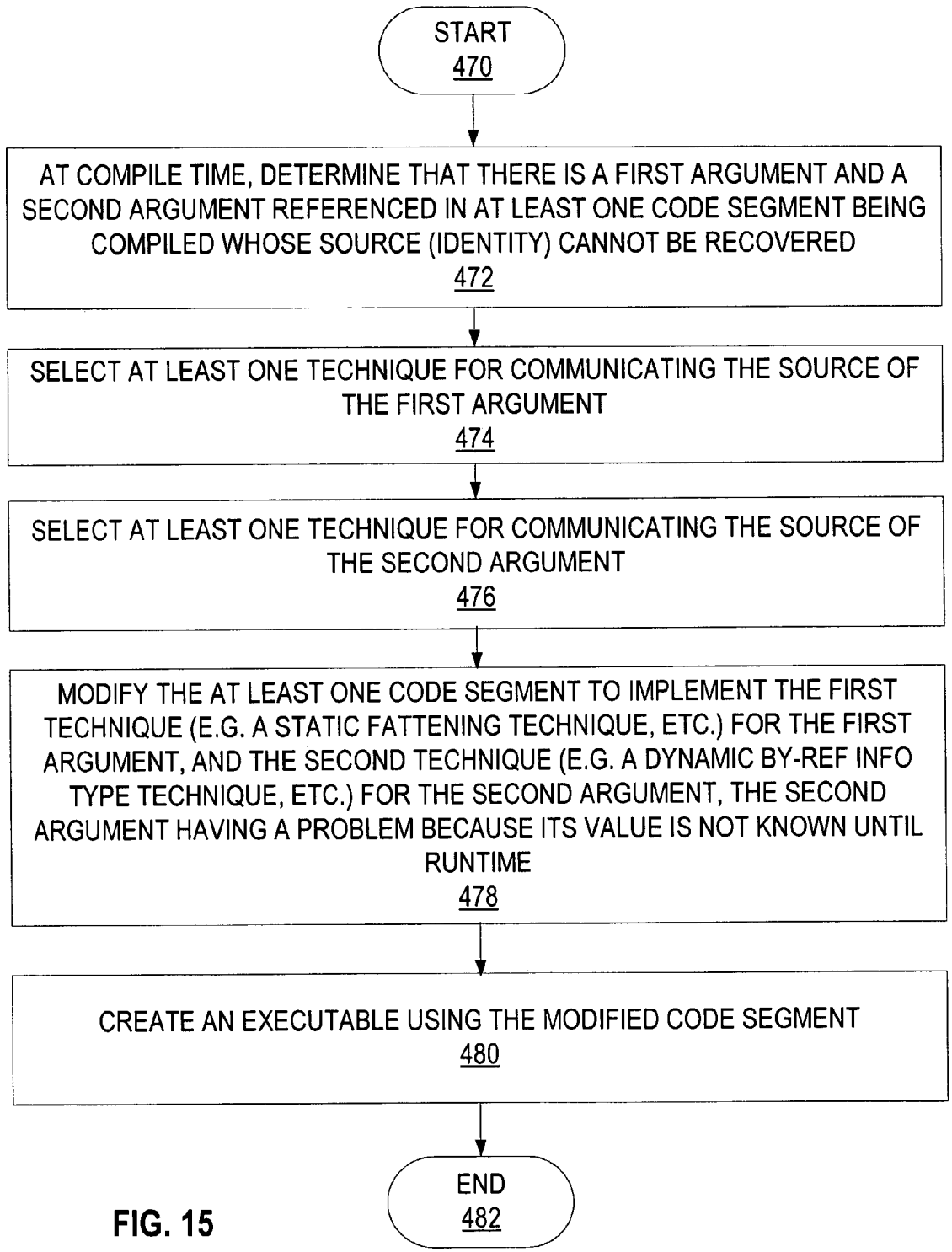
FIG. 15 is a process flow diagram for one implementation of the system of FIG. 1 that illustrates the stages involved in using a combination of techniques to allow the identity of the two objects to be recovered when needed.

FIG. 15 is a process flow diagram for one implementation of the system of FIG. 1 that illustrates the stages involved in using a combination of techniques to allow the identity of the two objects to be recovered when needed. In one form, the process of FIG. 15 is at least partially implemented in the operating logic of computing device 100. The procedure begins at start point 470 determining at compile time that there is a first argument and a second argument referenced in at least one code segment being compiled whose source (identity) cannot be recovered (stage 472). The system selects at least one technique for communicating with a source of the first argument (stage 474), and selects at least one technique for communicating with a source of the second argument (stage 476). The system modifies the at least one code segment to implement the first technique (e.g. a static fattening technique, etc.) for the first argument, and the second technique (e.g. a dynamic by-ref info type technique, etc.) for the second argument (stage 478). The second argument has a problem because its value is not known until runtime (stage 478). An executable is created using the modified code segment (stage 480). The process ends at end point 482.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, and/or data layouts as described in the examples discussed herein could be organized differently on one or more computers to include fewer or additional options or features than as portrayed in the examples.

What is claimed is:

1. A method for providing software transactional protection of managed pointers comprising the steps of:
    at compile time, using a compiler that emits calls to a software transactional memory system, the software transaction memory system is a concurrency control mechanism for controlling access to shared memory in concurrent computing;
    determining by the compiler that there are one or more variables being passed by reference to separately compiled code segments in at least one code segment being compiled, each variable being passed by reference using an address of the particular variable;
    selecting by the compiler at least one technique of a plurality of techniques for communicating the sources of the variables being passed by reference, wherein the at least one technique comprises either a fattened by-ref technique or a modified fattened by-ref technique that uses enumerations and structures, wherein the fattened by-ref technique comprises:
        creating a new by-ref info type that contains information necessary to distinguish different kinds of actual arguments;
        for a method that has at least one by-ref argument, change the by-ref argument to include an additional argument for a variable using the new by-ref info type; and
        at a call site for the method that has the at least one by-ref argument, inserting code to assign an appropriate one or more values to the new by-ref info type, and adding the type as a call site argument to the call to the method; and,
    wherein the modified fatten by-ref technique comprises:
        at each call site that invokes a particular method that has reference arguments needing identified, allocating a by-ref information holder; and
        passing the by-ref information holder by reference;
    modifying by the compiler the at least one code segment to implement the selected technique; and
    creating an executable using the modified code segment.

2. The method of claim 1, wherein the by-ref information holder is an instance of one of a plurality of pre-defined value types.

3. The method of claim 1, wherein technique is selected from the group consisting of a fattened by-ref technique, a modified fattened by-ref technique, and a static fattening technique.

4. A memory having computer-executable instructions for causing a computer to:
    at compile time, use a compiler that emits calls to a software transactional memory system, the software transaction memory system is a concurrency control mechanism for controlling access to shared memory in concurrent computing;
    determine by the compiler that there are one or more variables being passed by reference to separately compiled code segments in at least one code segment being compiled, each variable being passed by reference using an address of the particular variable;
    select by the compiler at least one technique of a plurality of techniques for communicating the sources of the variables being passed by reference, wherein the at least one technique comprises either a fattened by-ref technique or a modified fattened by-ref technique that uses enumerations and structures, wherein the fattened by-ref technique comprises:
        creating a new by-ref info type that contains information necessary to distinguish different kinds of actual arguments;

for a method that has at least one by-ref argument, change the by-ref argument to include an additional argument for a variable using the new by-ref info type; and at a call site for the method that has the at least one by-ref argument, inserting code to assign an appropriate one or more values to the new by-ref info type, and adding the type as a call site argument to the call to the method; and, wherein the modified fatten by-ref technique comprises:

at each call site that invokes a particular method that has reference arguments needing identified, allocating a by-ref information holder; and passing the by-ref information holder by reference;

modify by the compiler the at least one code segment to implement the selected technique; and create an executable using the modified code segment.

5. A memory having computer-executable instructions for causing a computer to perform steps comprising:

at compile time, using a compiler that emits calls to a software transactional memory system, wherein the software transaction memory system is a concurrency control mechanism for controlling access to shared memory in concurrent computing;

using the compiler, determine that there is a first argument and a second argument referenced in at least one code segment being compiled whose source cannot be recovered because the first argument and the second argument are variables being passed by reference using addresses of the variables;

select at least one technique of a plurality of techniques for communicating a first source of the first argument, wherein the at least one technique comprises either a fattened by-ref technique or a modified fattened by-ref technique that uses enumerations and structures, wherein the fattened by-ref technique comprises:

creating a new by-ref info type that contains information necessary to distinguish different kinds of actual arguments;

for a method that has at least one by-ref argument, change the by-ref argument to include an additional argument for a variable using the new by-ref info type; and at a call site for the method that has the at least one by-ref argument, inserting code to assign an appropriate one or more values to the new by-ref info type, and adding the type as a call site argument to the call to the method; and, wherein the modified fatten by-ref technique comprises:

at each call site that invokes a particular method that has reference arguments needing identified, allocating a by-ref information holder; and passing the by-ref information holder by reference;

select at least one technique of the plurality of techniques for communicating a second source of the second argument, the second technique solving a problem that is only present with the second argument and not the first argument; and modify the at least one code segment to implement the first technique for the first argument and the second technique for the second argument.

6. The computer-readable medium of claim 5, wherein the problem that is only present with the second argument is that a value of the second argument is not known until runtime.

7. The computer-readable medium of claim 6, wherein the problem is solved using a dynamic by-ref info type technique.

* * * * *